(12) United States Patent
Shivashankaran et al.

(10) Patent No.: US 10,142,438 B2
(45) Date of Patent: Nov. 27, 2018

(54) INTERMEDIATE DESTINATION MODULE FOR COMMUNICATION OF INTERACTION DATA WITH DISPARATE INTERMEDIATE DESTINATIONS

(71) Applicant: SAP SE, Walldorf (DE)

(72) Inventors: Vipin Shivashankaran, Bangalore (IN); Prateek Tripathi, Bangalore (IN); Sreejith Mohan Menon, Palakkad (IN); Soumya Ranjan Das, Cuttack (IN); Joy Paraekattil, Kerla (IN); Karthik Thiru, Bengaluru (IN); Yatendra Tiwari, Bengaluru (IN); Venkata Sudhakar, Bengaluru (IN); Srikanth BR, Bangalore (IN)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 15/260,083

(22) Filed: Sep. 8, 2016

(65) Prior Publication Data
US 2018/0069943 A1 Mar. 8, 2018

(51) Int. Cl.
*H04L 29/08* (2006.01)

(52) U.S. Cl.
CPC ...... *H04L 67/2842* (2013.01); *H04L 67/2823* (2013.01)

(58) Field of Classification Search
CPC ............. H04L 67/2842; H04L 67/2823; H04L 67/288
See application file for complete search history.

(56) References Cited

U.S. PATENT DOCUMENTS

| | | | | |
|---|---|---|---|---|
| 2004/0064351 A1* | 4/2004 | Mikurak | ............... | G06Q 10/087 705/22 |
| 2004/0177108 A1* | 9/2004 | Connelly | ................ | G06F 9/542 709/201 |
| 2008/0126513 A1* | 5/2008 | Bouchard | ......... | G06F 17/30011 709/217 |
| 2014/0380273 A1* | 12/2014 | Sabbouh | ................... | G06F 8/31 717/114 |
| 2015/0381284 A1* | 12/2015 | Maejima | .............. | H04B 10/564 398/25 |

* cited by examiner

*Primary Examiner* — Michael A Keller
(74) *Attorney, Agent, or Firm* — Jones Day

(57) ABSTRACT

Systems and methods are provided for transmitting documents via a computer network. An intermediate destination module is configured to identify a particular intermediate destination for interaction data, where the intermediate destination module comprises a database, where the database includes intermediate destination data records, where an intermediate destination data record includes an identification of a particular intermediate destination and data submission process steps for the particular intermediate destination. A process manager is configured to receive data submission process steps for an intermediate destination associated with a current set of interaction data and to perform the data submission process steps for that intermediate destination, where the data submission steps include formatting the interaction data to match a format requirement for that intermediate destination, and a transmission module is configured for transmitting the formatted interaction data to the intermediate destination.

20 Claims, 18 Drawing Sheets

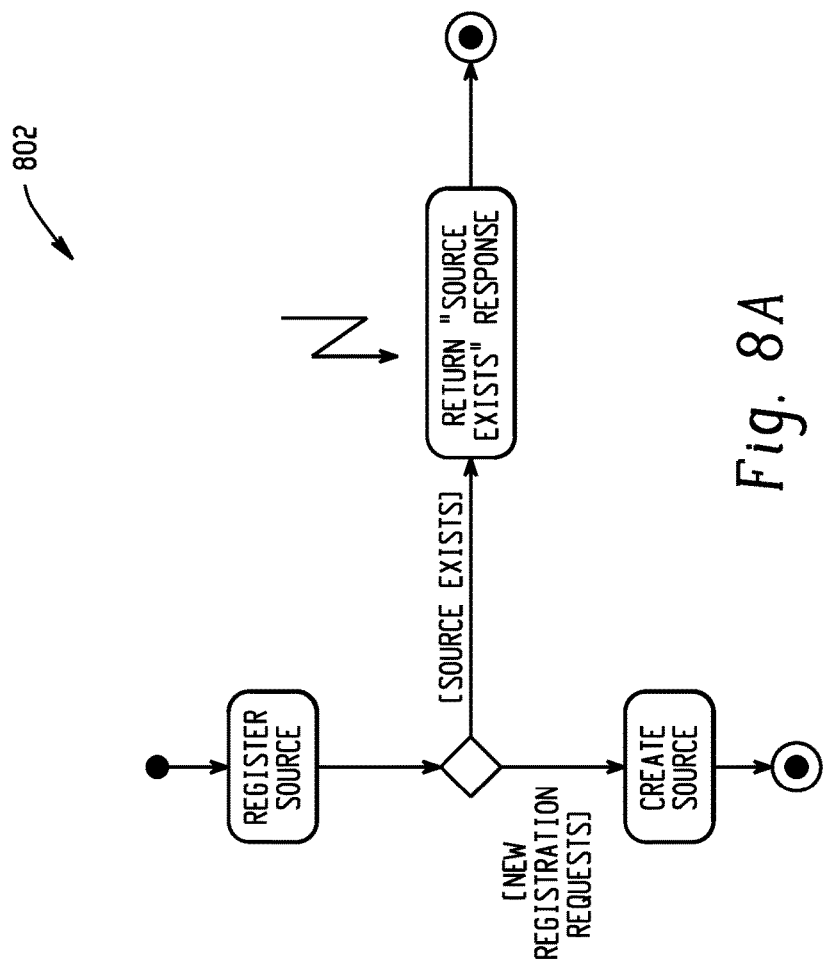

INTERMEDIATE DESTINATION MODULE FOR COMMUNICATION OF INTERACTION DATA WITH DISPARATE INTERMEDIATE DESTINATIONS

BACKGROUND

The enormous rise in data networking availability has facilitated fast communication all around the world. While transmission and processing speeds have continued to increase, to date, there is no common data transmission protocol and format that is consistent across all networked entities. For data to be successfully transmitted, not only must a network portal be available, but that data must be transmitted in the proper format and protocol for the destination, and in some cases intermediate destinations that will consume the data. Where an entity seeks to communicate with several different intermediate and final destinations, tracking these protocols and formats becomes substantially cumbersome.

SUMMARY

Systems and methods are provided for transmitting documents via a computer network. A network interface is configured to receive interaction data based on an interaction between a first entity and a second entity from the first entity according to a predetermined data format. An intermediate destination module is configured to identify a particular intermediate destination for the interaction data, where the intermediate destination module comprises a database, where the database includes intermediate destination data records, where an intermediate destination data record includes an identification of a particular intermediate destination and data submission process steps for the particular intermediate destination. A process manager is configured to receive data submission process steps for an intermediate destination associated with a current set of interaction data and to perform the data submission process steps for that intermediate destination, where the data submission steps include formatting the interaction data to match a format requirement for that intermediate destination, and a transmission module is configured for transmitting the formatted interaction data to the intermediate destination, where the interaction data is further transmitted from the intermediate destination to the second entity.

As another example, a processor-implemented method for transmitting documents via a computer network includes receiving interaction data based on an interaction between a first entity and a second entity from the first entity according to a predetermined data format via a network. A particular intermediate destination for the interaction data is identified using a database, where the database includes intermediate destination data records, where an intermediate destination data record includes an identification of a particular intermediate destination and data submission process steps for the particular intermediate destination. Data submission process steps are received for the particular intermediate destination associated with the interaction data from the database. The data submission process steps for the particular intermediate destination are performed including formatting the interaction data to match a format requirement for the particular intermediate destination, and the formatted interaction data is transmitted to the intermediate destination, where the interaction data is further transmitted from the particular intermediate destination to the second entity.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One advantage is that interaction data can be received from a first entity, translated, and transmitted according to the requirements of one of a variety of intermediate entities without knowledge of data process and format requirements of the intermediate entities by the first entity. Thus, all requirements of the intermediate entity can be met, such that the interaction data can then be forwarded from the intermediate entity to a second entity that had the interaction with the first entity that resulted in the interaction data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
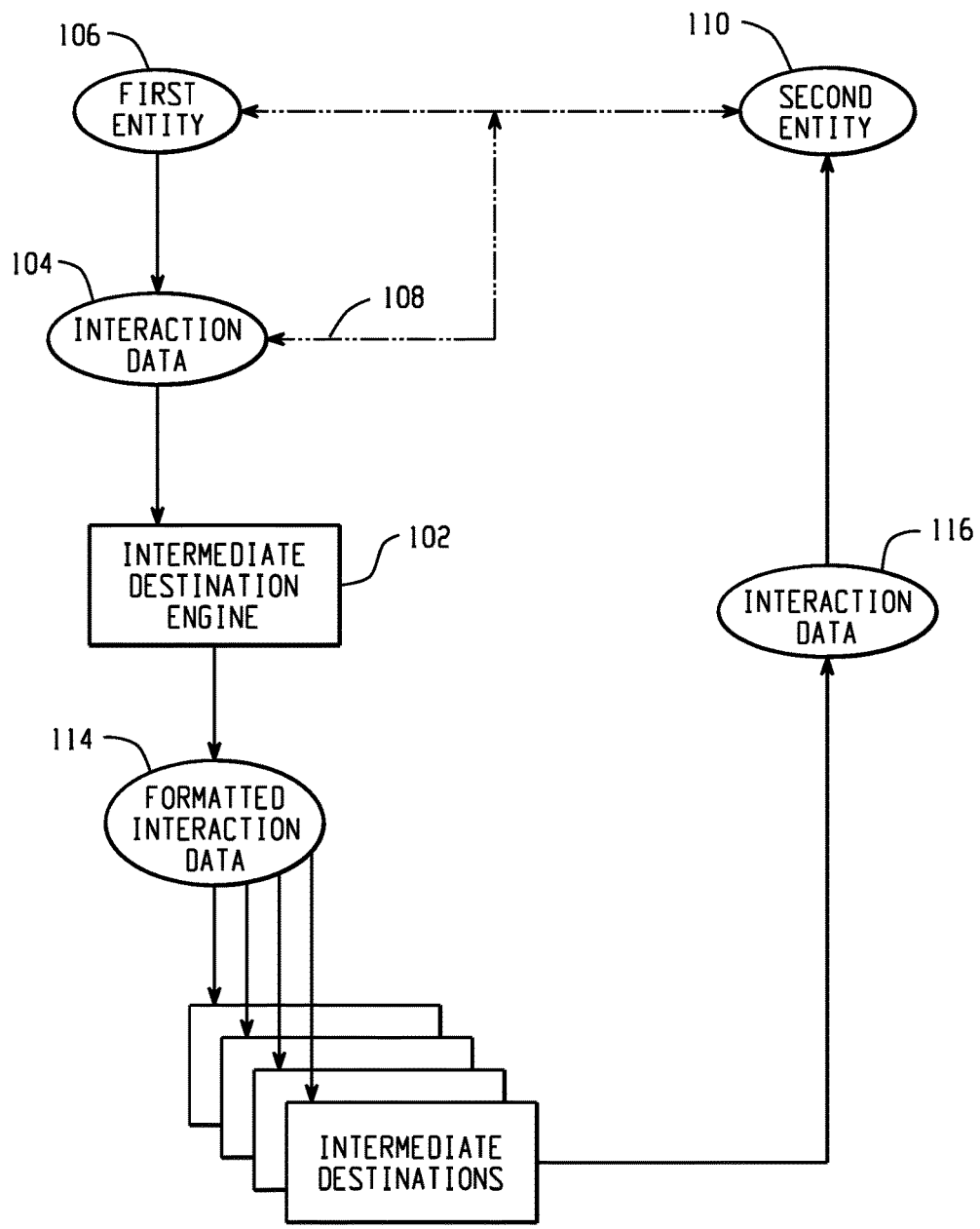
FIG. 1 is a diagram depicting a processor-implemented system for transmitting documents via a computer network.

FIG. 1 is a diagram depicting a processor-implemented system for transmitting documents via a computer network. The system includes an intermediate destination engine 102 that receives interaction data 104 from a first entity 106. As indicated at 108, that interaction data 104 is based on an interaction between the first entity 106 and a second entity 110. That interaction data 104 is to be transmitted to one or more intermediate destinations 112, which each may have their own transmission protocols and data format requirements, prior to being transmitted to the second entity 110. For example, one of the intermediate destinations 112 may be a legacy system that requires data to be transmitted to it using a particular communication protocol or in a specific legacy format. The intermediate destination engine 102 facilitates that process by receiving the interaction data 104 from the first entity, detecting which intermediate destination 112 that interaction data 104 is intended, and formatting and transmitting that data as formatted interaction data 114 to the appropriate intermediate destination 112. The intermediate destination 112 processes the formatted interaction data 114 and then propagates that interaction data in some format (e.g., in the same format as received at 114, in an augmented format with extra data added, in the format indicated at 104, or in an entirely different format), as indicated at 116.

Figure 2:
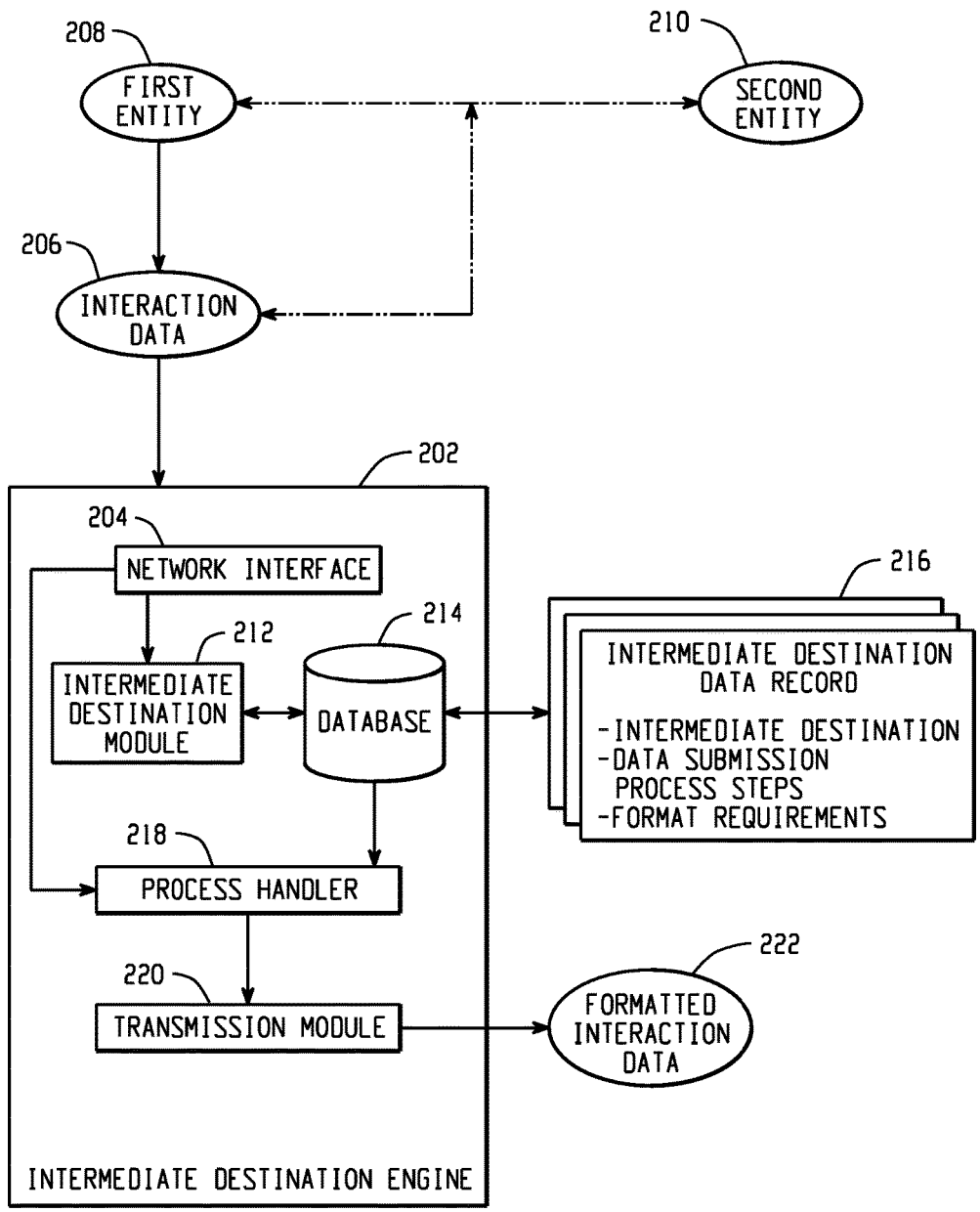
FIG. 2 is a block diagram depicting example components of a system for transmitting documents via a computer network.

FIG. 2 is a block diagram depicting example components of a system for transmitting documents via a computer network. In an intermediate destination engine 202, a network interface 204 is configured to receive interaction data 206 based on an interaction between a first entity 208 and a second entity 210. An intermediate destination module 212 is configured to identify a particular intermediate destination for the interaction data 206. The intermediate destination module 212 is responsive to a database 214. That database 214 includes intermediate destination data records 216. In the example of FIG. 2, the intermediate destination data records 216 include an identification of a particular intermediate destination, data submission process steps associated with the particular intermediate destination, and format requirements for communications to that particular intermediate destination. A process manager 218 is configured to receive data submission process steps for a particular intermediate destination associated with a current set of interaction data 206 and to perform the data submissions steps for that intermediate steps including formatting the interaction data 206 to match the format requirement for the particular intermediate destination. A transmission module 220 is configured for transmitting the formatted interaction data 222 to the particular intermediate destination, where the interaction data is further transmitted from the intermediate destination to the second entity 210.

Figure 3:
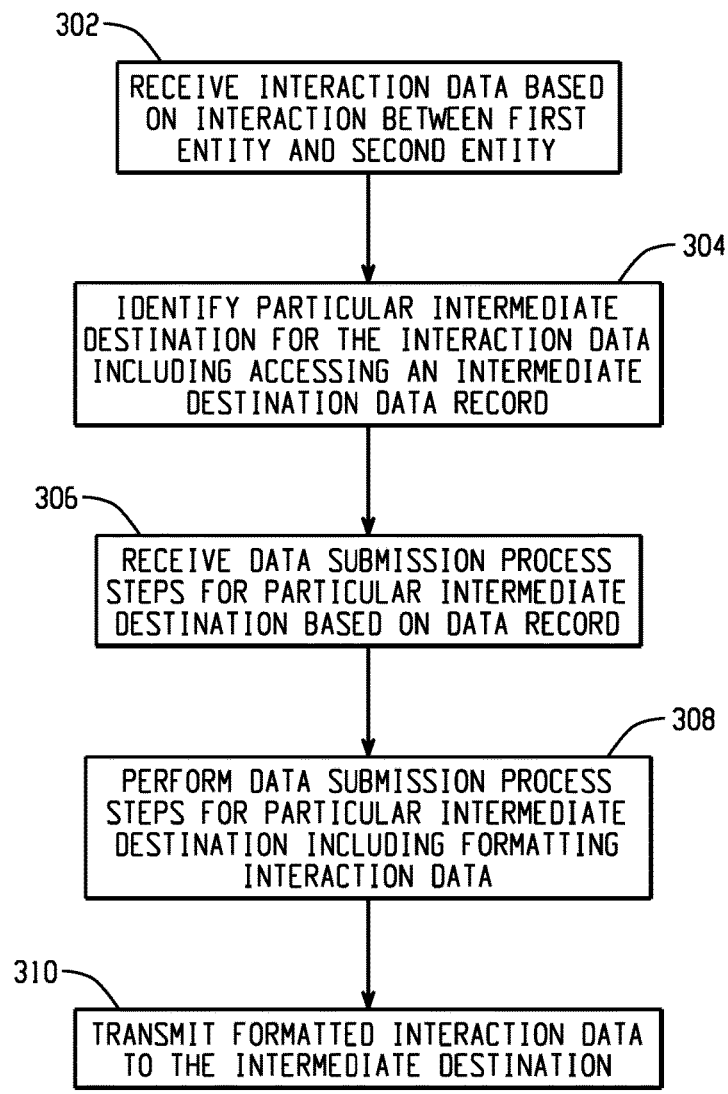
FIG. 3 is a flow diagram depicting example steps of a processor-implemented method for transmitting documents via a computer network.

FIG. 3 is a flow diagram depicting example steps of a processor-implemented method for transmitting documents via a computer network. The method includes receiving interaction data based on an interaction between a first entity and a second entity from the first entity according to a predetermined data format via a network at 302. At 304, a particular intermediate destination for the interaction data is identified using a database, where the database includes intermediate destination data records, where an intermediate destination data record includes an identification of a particular intermediate destination and data submission process steps for the particular intermediate destination. Data submission process steps are received at 306 for the particular intermediate destination associated with the interaction data from the database. The data submission process steps for the particular intermediate destination are performed at 308, including formatting the interaction data to match a format requirement for the particular intermediate destination, and the formatted interaction data is transmitted to the intermediate destination, where the interaction data is further transmitted from the particular intermediate destination to the second entity at 310.

Intermediate destination engines, as described in certain examples herein, can be implemented in a variety of contexts. For example, an intermediate destination engine can be used in scenarios where data must be communicated through one of a plurality of government organization systems. For example, in certain jurisdictions (e.g., Brazil, Mexico) it is required for all electronic invoices that are posted to an organization's system to be transmitted through government systems for approval (e.g., before those invoices are forwarded to the recipient of goods or services, for tax purposes). For organizations that operate in multiple jurisdictions (e.g., companies operating in many countries), it may be cumbersome to keep track of the particular reporting requirements for each jurisdiction, especially where invoices are submitted within the organization to a central repository that encompasses multiple jurisdictions. An intermediate destination engine, as described herein, tracks the transmission protocols, data formats, and other requirements of each jurisdiction. Such a system can receive invoice data in a generic format, determine the jurisdiction where formatted invoice data is to be transmitted, perform that formatting, and transmit that formatted invoice data according to the protocols for the determined jurisdiction.

Figure 4:
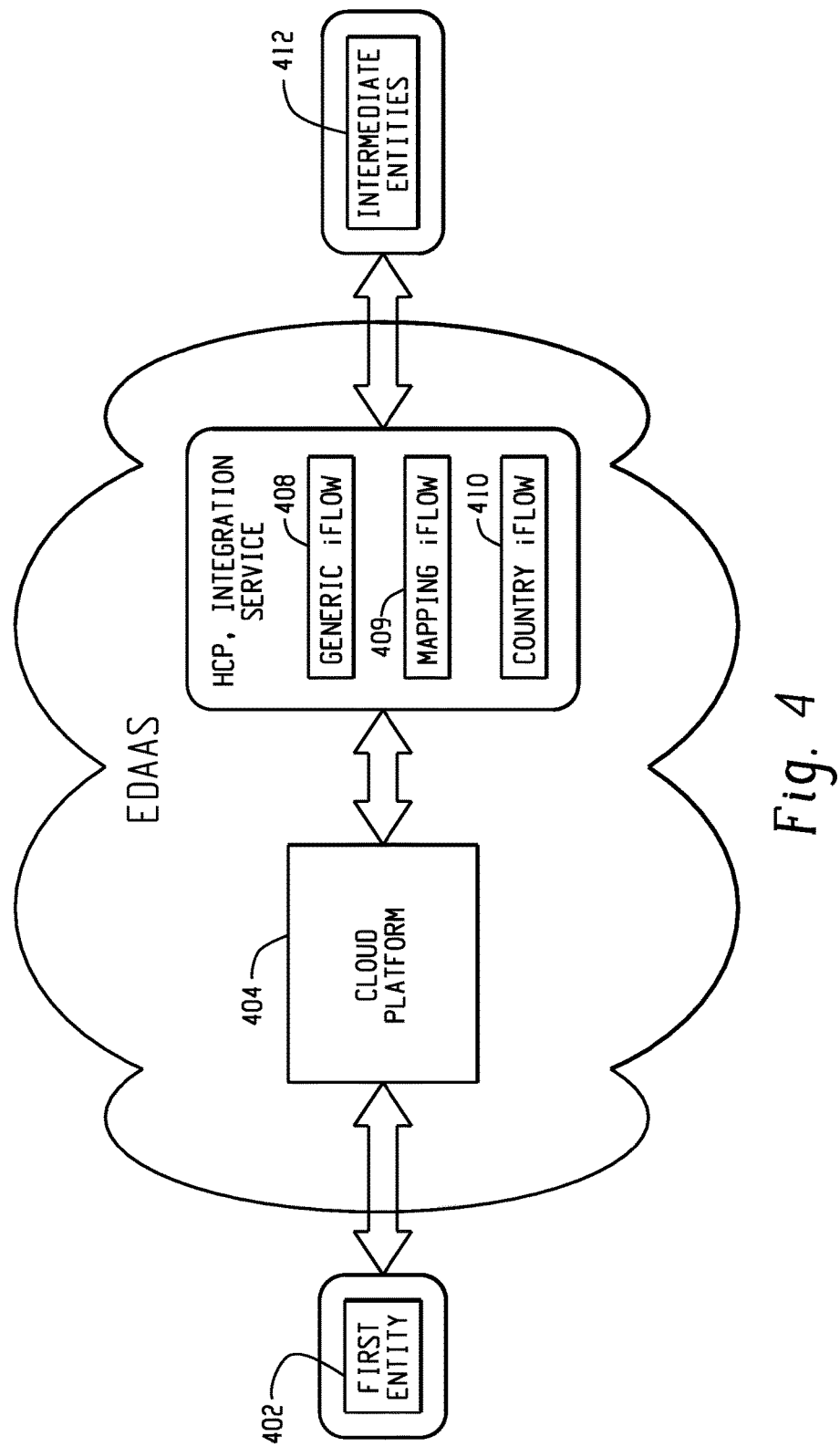
FIG. 4 is a diagram depicting an example cloud based intermediate destination engine.

FIG. 4 is a diagram depicting an example cloud based intermediate destination engine. The system of FIG. 4 is housed on one or more servers, indicated by the cloud labeled EDAAS, that are accessible via a network (e.g., a public network, such as the Internet). A first entity 402 transmits data to the intermediate destination engine (EDAAS), which receives that interaction data at an interface of the cloud platform 404. The interface of the cloud platform 404 provides the interaction data to certain operating modules 408, 410 which process the interaction data prior to that data being communicated to one or more intermediate entities 412. In the example of FIG. 4, a first operating module is a generic integration flow (iFlow) module 408. That generic integration flow module 408 is configured to convert generic content (e.g. content received in a non-country-specific base64 encoded XML format that includes header information) to country content. Based on a country and scenario specification in the header, the country specific mapping (e.g., as depicted at 409 as mapping integration flow (iFlow)) converts the data into a country (e.g., tax authority) specific data structure as specified by that authority, which is then transmitted to the country integration flow (iFlow) module 410, which handles further country specific processing. In instances where data received from the first entity 402 is already in a proper format for receipt by the destination intermediate entity(ies) 412 (i.e., not in the generic formation), a country integration flow module 410 receives country data directly without processing by the generic integration flow module 408. The country integration flow module 410 receives data and handles certain requirements (e.g., signing and security requirements) for the specific jurisdiction before transmitting the data to the appropriate intermediate entities 412. The country integration flows 408, 410, in one embodiment, also process response and status information received from those intermediate entities 412.

Figure 5:
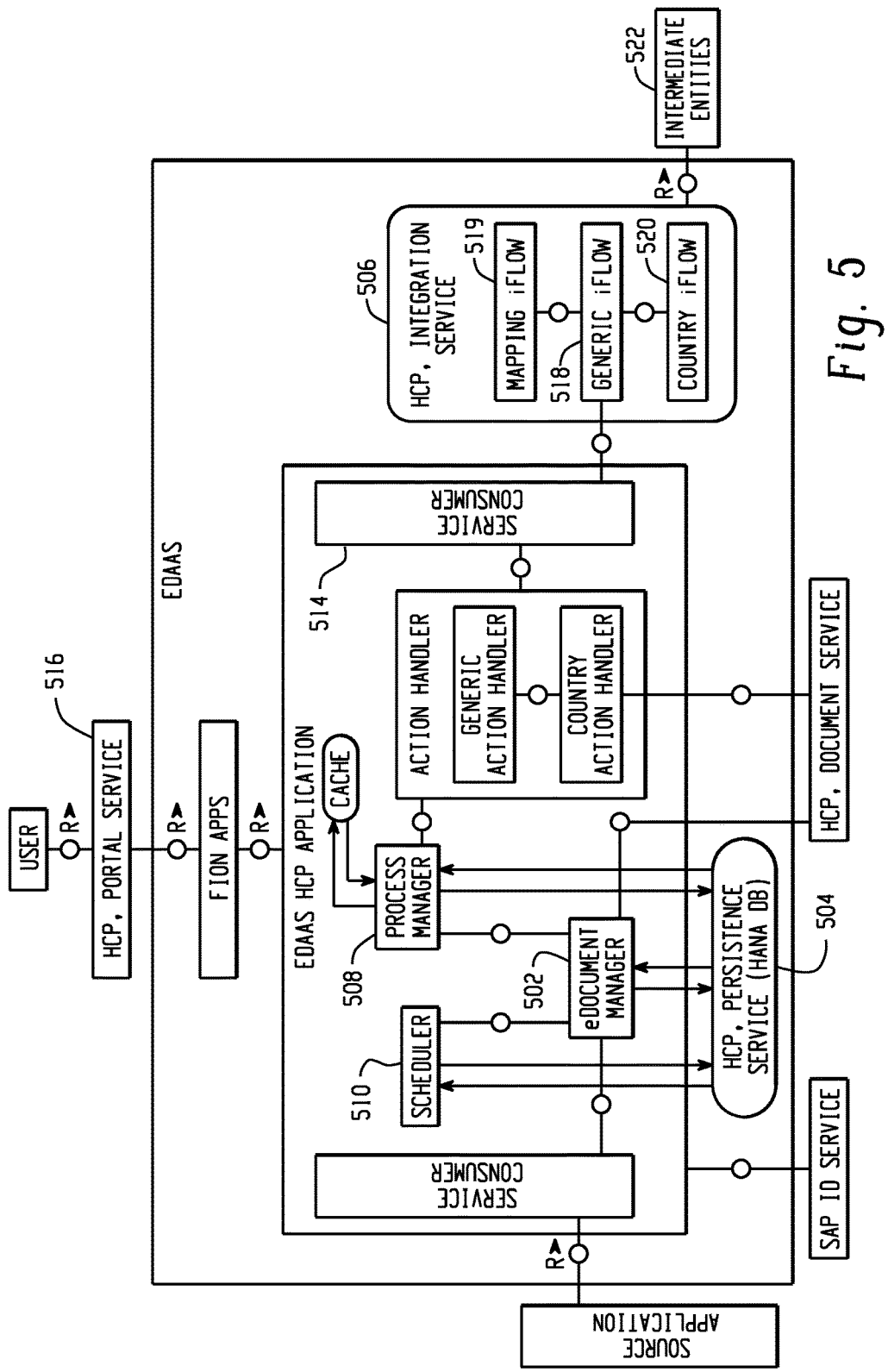
FIG. 5 is a diagram depicting example entities of a cloud based intermediate destination engine.

FIG. 5 is a diagram depicting example entities of a cloud based intermediate destination engine. In the example of FIG. 5, an application handler (eDocument Manager) 502 controls the application and handles interactions between other modules. In one embodiment, the application handler 502 also manages data persistence and handling via database 504 (HCP, Persistence Service (HANA DB)). A country module 506 (HCP, Integration Service) contains logic for processing interaction data for each destination jurisdiction. The country module 506 includes process steps that may describe formatting requirements for interaction data for individual jurisdictions. A process manager 508 reads the process steps for each country (e.g., from 506) and performs the identified actions based on that data. Status updates may be provided based on the progression of those process steps.

In one embodiment, a scheduler 510 handles scheduling of performing operations on individual sets of interaction data. In some embodiments, the duration necessary to process data for different jurisdictions varies, where job scheduling could be beneficial. In some embodiments, multiple sets of interaction data can be processed in a batch mode (e.g., without an affirmative command from a user). Example tasks of a scheduler 510 include identifying interaction data that has not had its processing finished and to provide that unfinished interaction data to the process manager 508 at predefined time intervals. A scheduler 510 may provide functionality (e.g., via a graphical user interface) for an operator to control data at a customer or country level and to start, stop, and pause individual interaction data jobs or multiple interaction data jobs. In certain embodiments, the intermediate destination engine is implemented using a Simple Object Access Protocol (SOAP) service having different operations to handle document communications including onboarding processes, data transmission processes, providing status updates, providing transmission reporting, and to add or delete data/documents to be transmitted.

Further example entities can include a service consumer 514 that is configured for consuming external services or APIs. For example, the service consumer 514 can be configured to consume a scenario specific generic interface to process the country mapping and to send data to the governmental authority. A monitor module 516 (HCP, Portal Service) provides an interface for operators to view and manage interaction data throughout its life cycle including manually transmitting formatted interaction data to an intermediate entity and to check status of individual sets of interaction data. A generic integration flow module 518 and country integration flow modules 520 are configured to operate (e.g. using a mapping iFlow at 519) as described with respect to FIG. 4 at 408, 409, 410, respectively.

Figure 6:
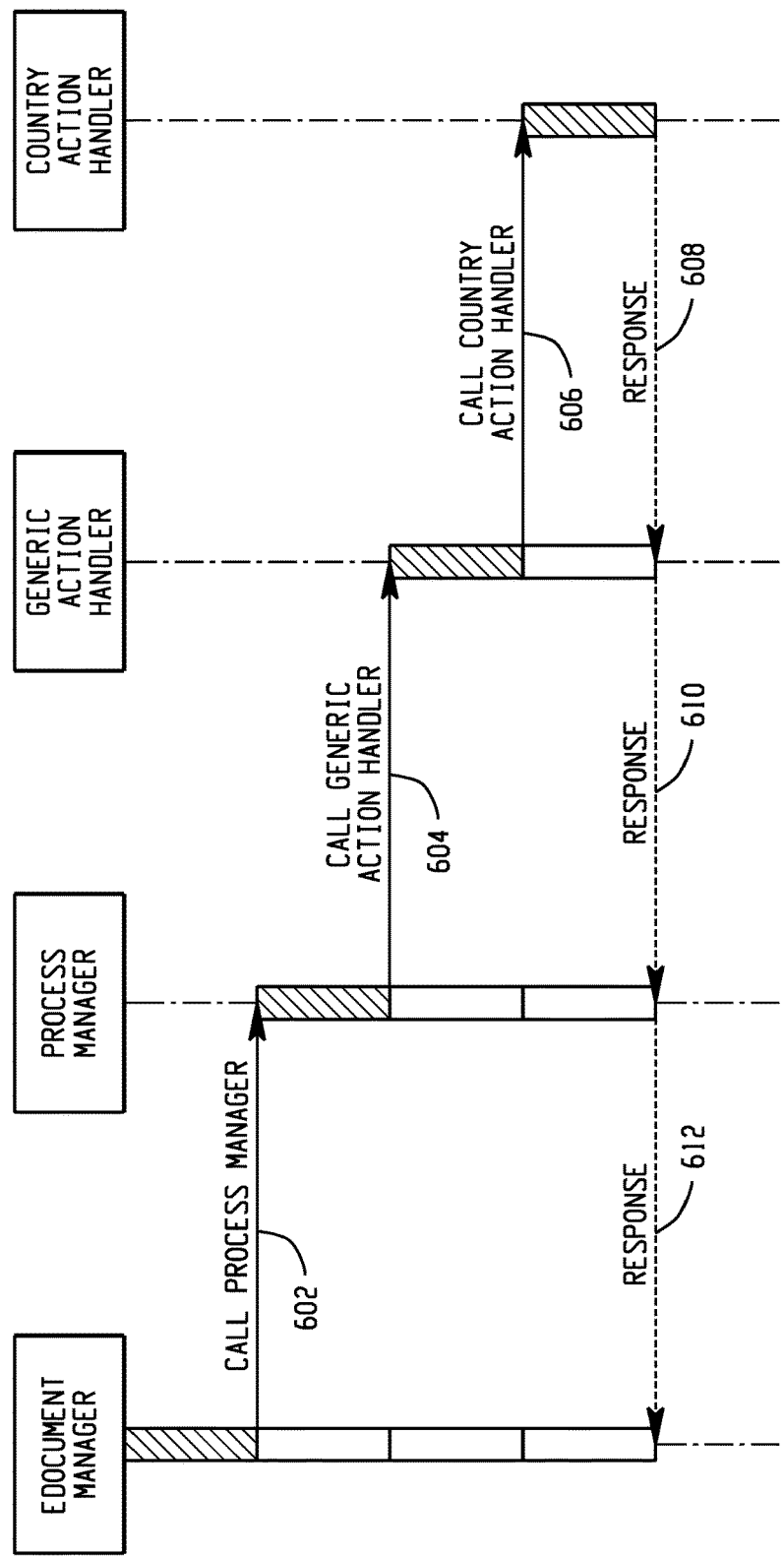
FIG. 6 is a diagram depicting a flow of data among various entities in an example system.

FIG. 6 is a diagram depicting a flow of data among various entities in an example system. In the example of FIG. 6, the application handler (502) makes a call to the process manager (508) at 602, which makes a subsequent call to the generic action handler (generic iFlow 518) at 604. The generic action handler makes one or more calls to specific country action handlers (country iFlows 520) at 606, with results and/or status updates from each of the country action handlers being passed back to the generic action handler at 608, and results and/or status updates being further returned to the process manager and application handler at 610, 612.

Figure 7:
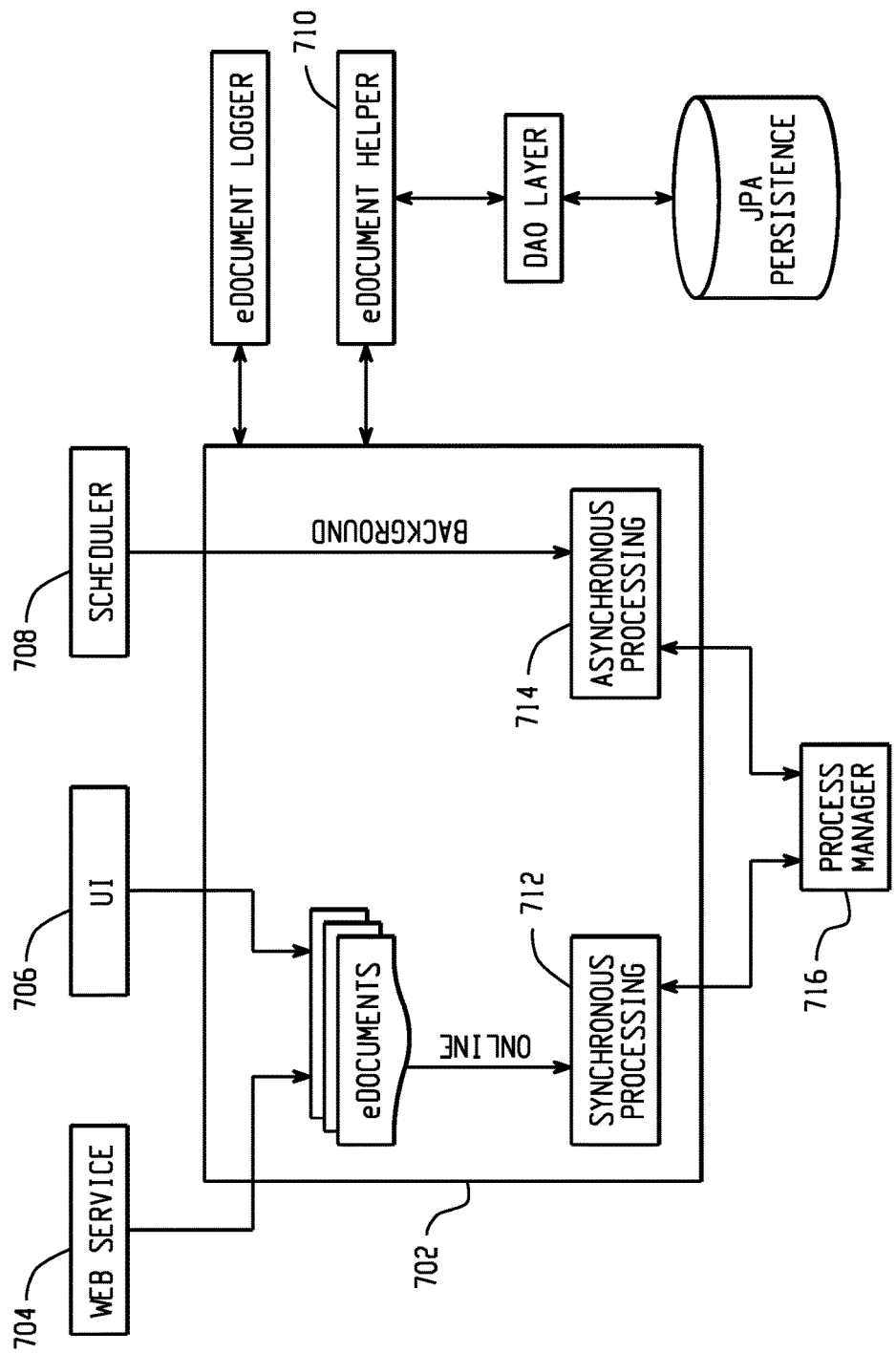
FIG. 7 is a diagram depicting an example arrangement of an eDocument manager.

In one example, the application handler of FIG. 5 (502) is implemented as an eDocument manager. FIG. 7 is a diagram depicting an example arrangement of an eDocument manager. An eDocument manager 702 is configured to act as a controller that provides an interface to external calls triggered from a web service 704, a user interface 706, or a scheduler 708. The eDocument manager 702 interacts with an eDocument helper 710 to identify generic details of a set of interaction data, such as a source identifier, an eDocument identifier, and a process identifier. The eDocument helper 710 utilizes a data access object layer to read data from the persistence layer. The eDocument helper 710, in one embodiment, operates as a bridge between the eDocument manager 702 and the underlying persistence layers.

In one example, the eDocument manager 702 processes data in two ways. The first is an online (synchronous) processing method 712. Online processing 712 is used when a request is triggered from the web service 704 or the user interface 706. Online processing 712 is synchronous, where the eDocument manager 702 waits for the eDocument to be processed completely. Thereafter, a response is sent back to the triggering object. In contrast, background processing 714 is used when a request is triggered by the scheduler 708. Background processing 714 is an asynchronous processing, where the eDocument manager 702 triggers (sends) the document to the process manager 716 for further processing, and the call ends.

Figure 8B:
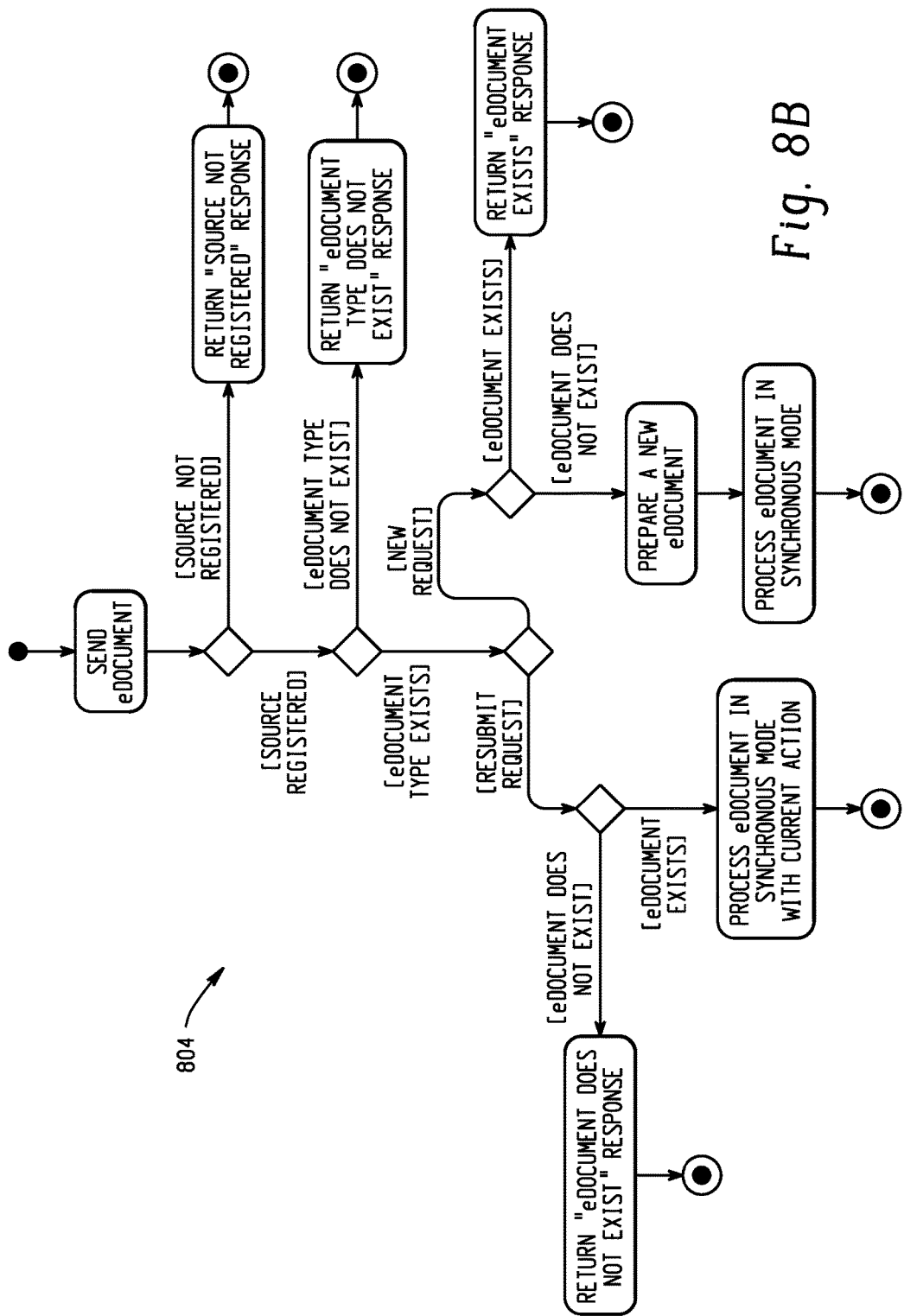
FIGS. 8-9 depict example algorithms for eDocument operations.
Figure 9A:
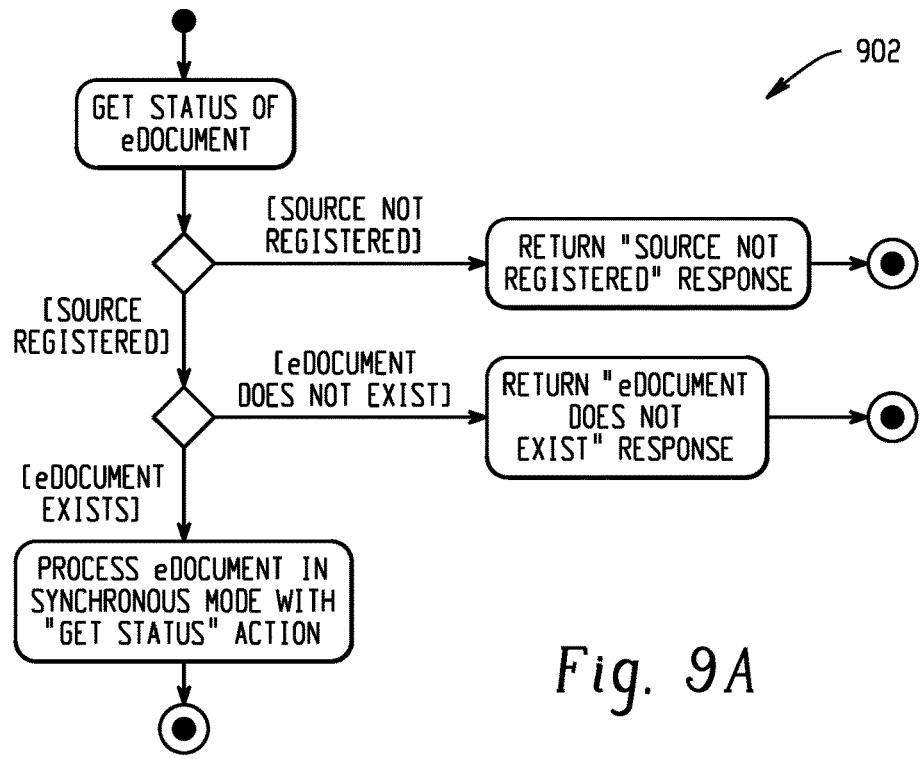
Figure 9B:
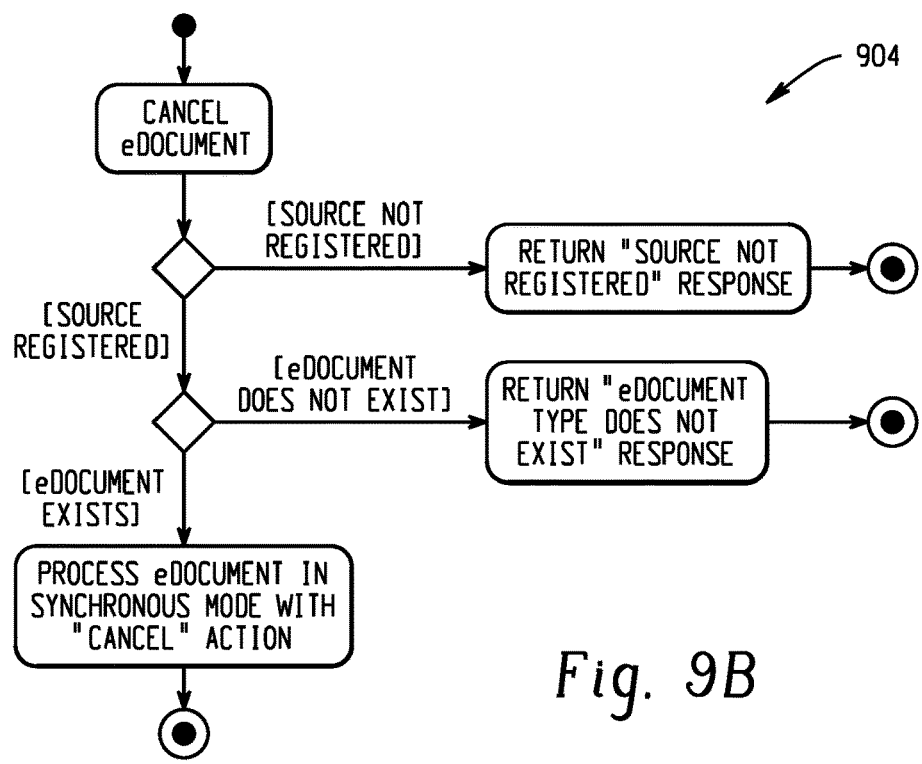

FIGS. 8-9 depict example algorithms for eDocument operations by an application handler (e.g., an eDocument manager). In FIG. 8 at 802, an algorithm for creating and submitting eDocuments to the receiver system is depicted. At 804, an algorithm for sending eDocuments is shown. In FIG. 9, an algorithm for ascertaining and returning the status of eDocuments is disclosed at 902, and at 904, an algorithm for cancelling an eDocument process is shown.

Figure 10:
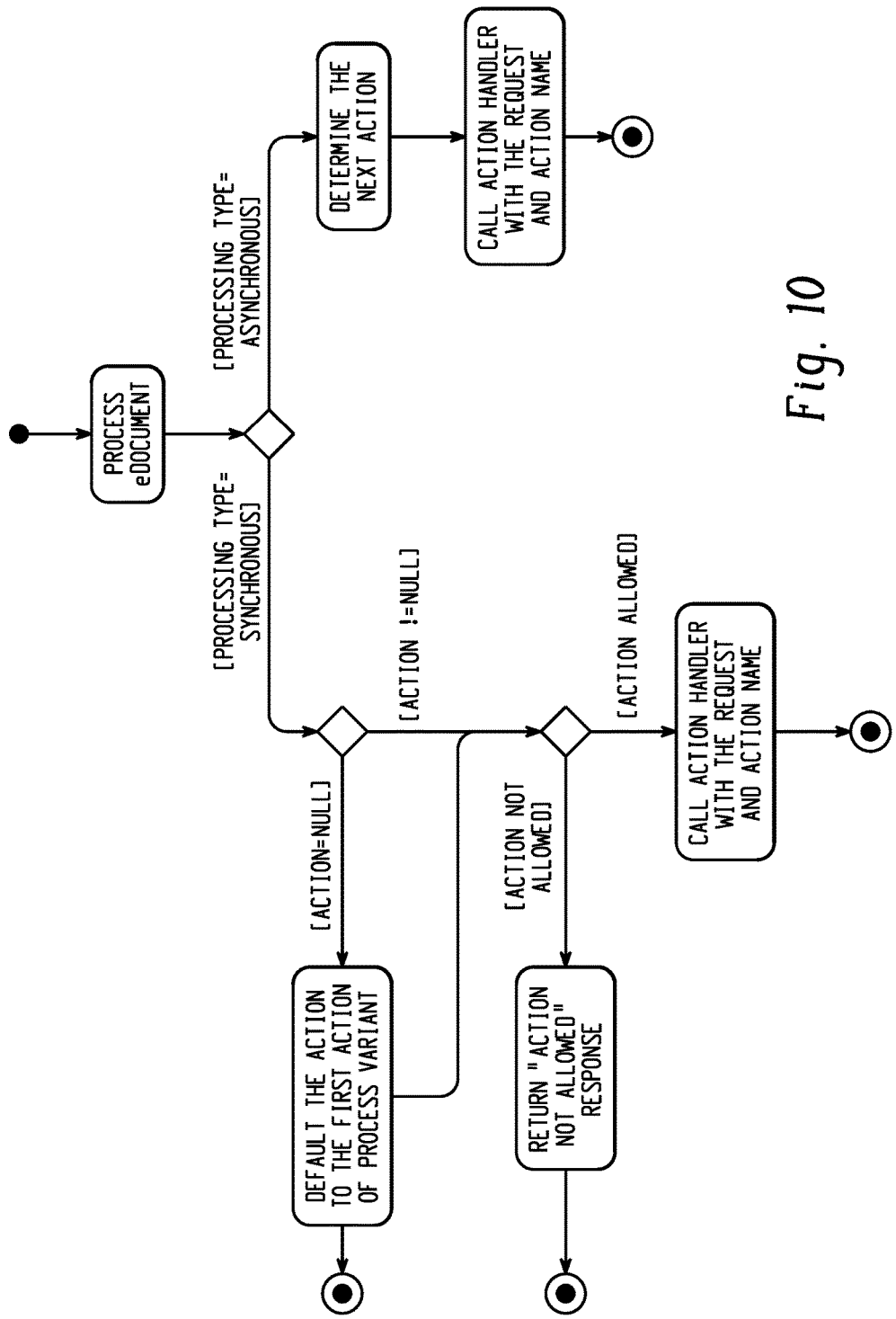
FIGS. 10-12 depict example algorithms for process manager operations.
Figure 11:
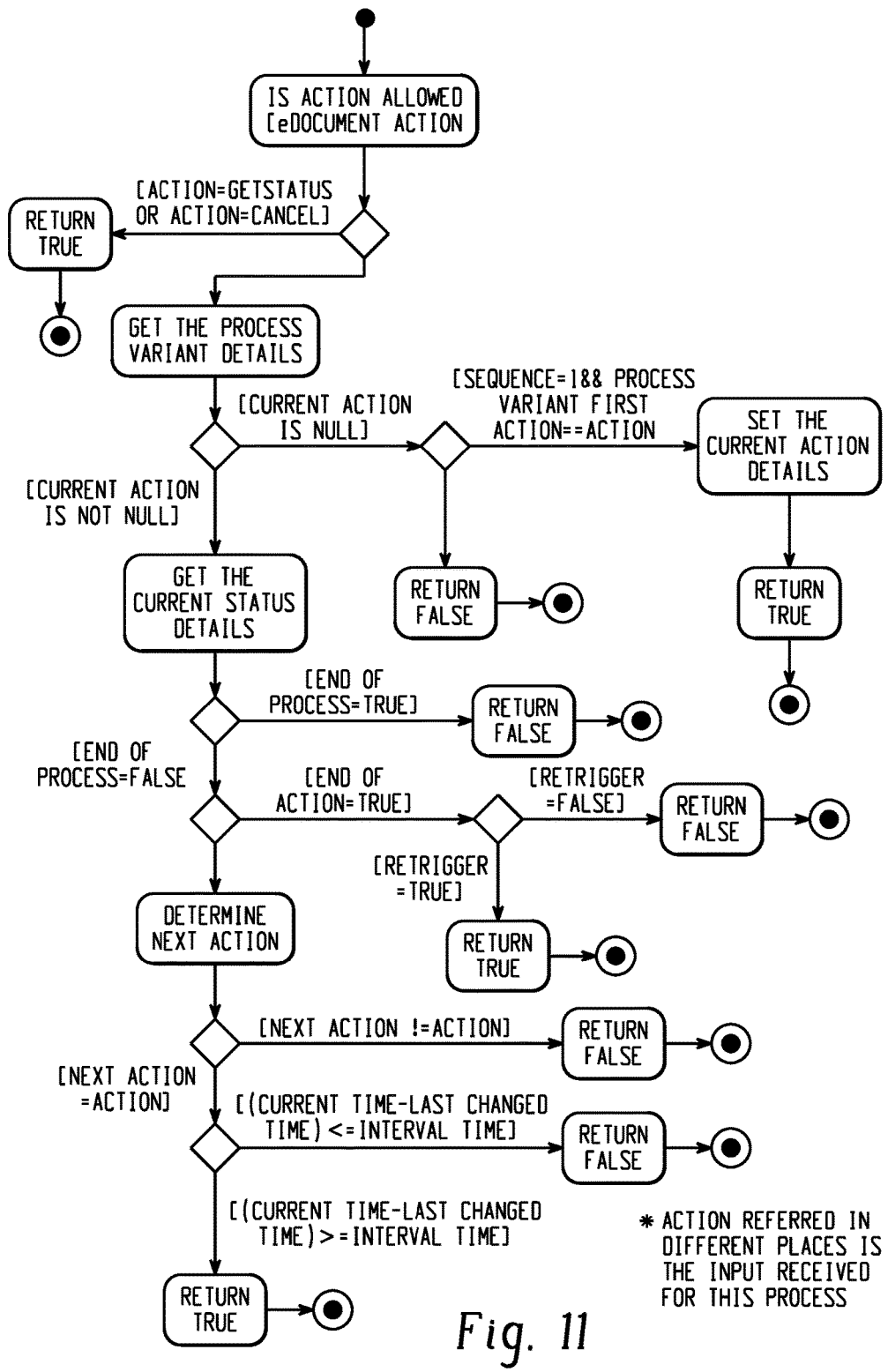
Figure 12:
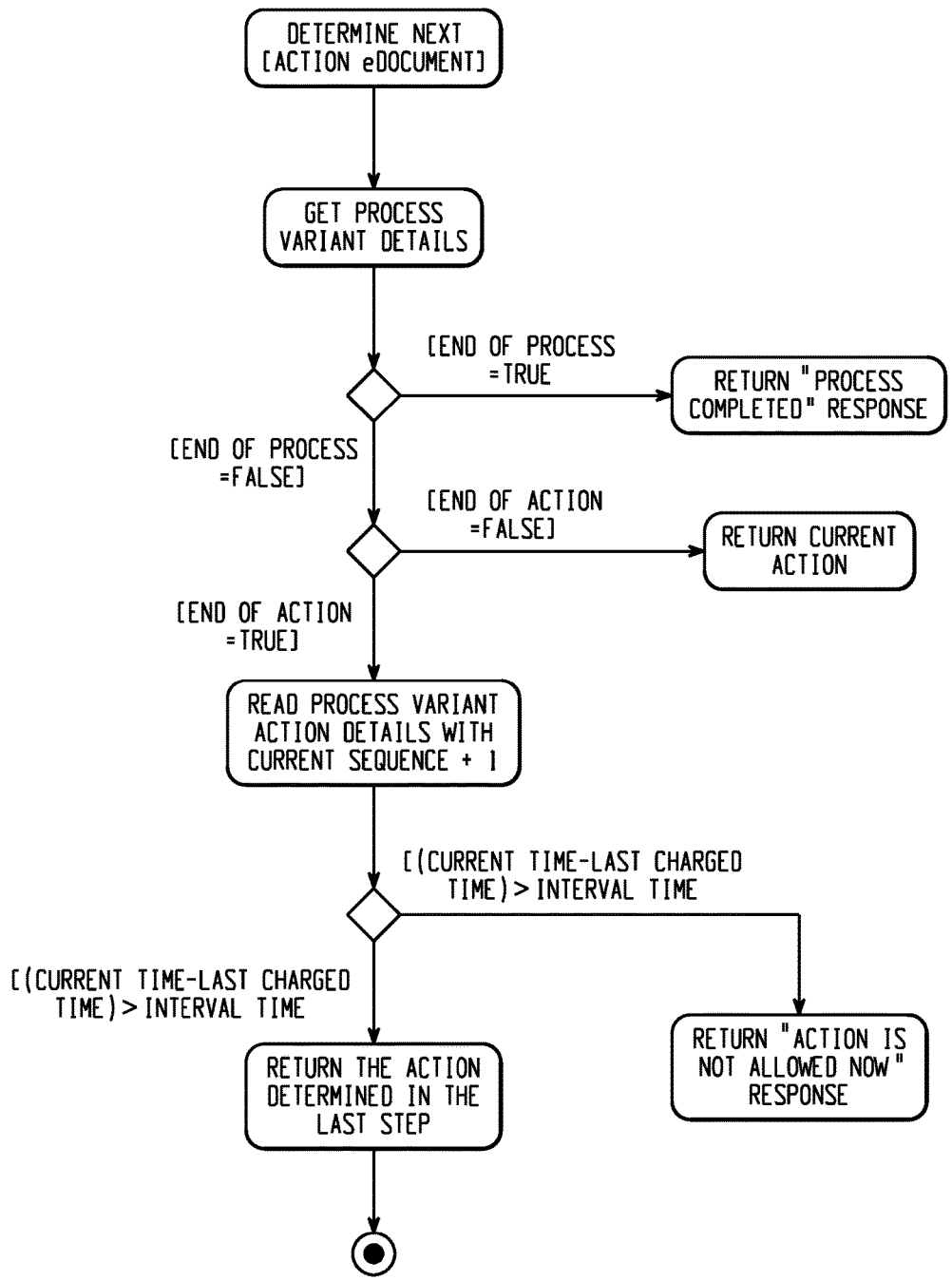

A process manager (e.g., process manager 508 in FIG. 5) is configured to define the process flow of an eDocument, determine subsequent actions of the eDocument based on a current status, trigger events for an action, determine the status of an eDocument, and determine the endpoint to be triggered for the subsequent action. FIGS. 10-12 depict example algorithms for process manager operations. In FIG. 10, a high level process flow algorithm for an example process manager is depicted. FIG. 11 depicts an example process for performing an allowed action. FIG. 12 illustrates an algorithm for determining a next action.

Figure 13:
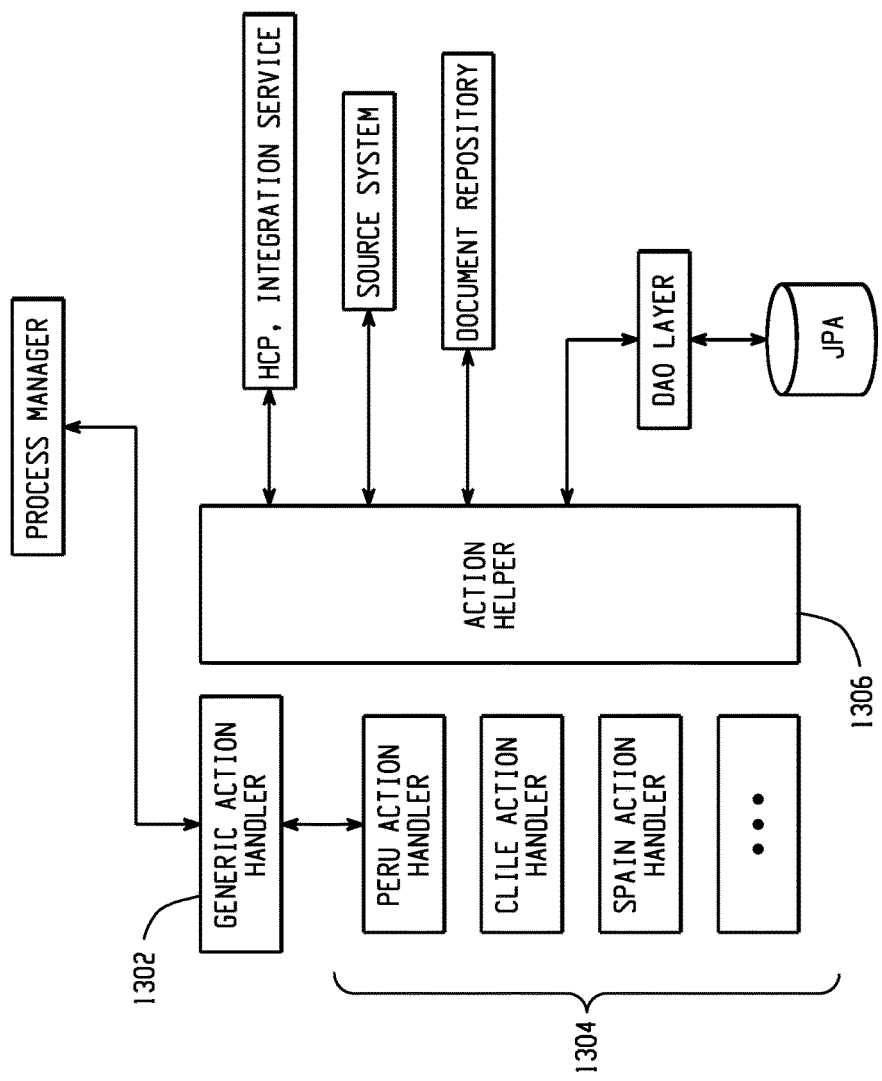
FIG. 13 is a diagram depicting example action handler components.

FIG. 13 is a diagram depicting example action handler components. In one embodiment, during eDocument processing, the process manager determines the action to be performed on each eDocument. The actual task of performing the action on the eDocuments is carried out by an action handler. An action handler, in this example, is further subdivided into three main components. A generic action handler 1302 provides a super class. Tasks which are common to all countries are handled in this component. Country action handler classes 1304 (one for each country) are the subclasses of generic action handler class 1302. Tasks which are specific to a country are handled in the specific country action handler class 1304. An action handler helper 1306 helps the country 1304 and generic 1302 action handlers in performing certain tasks like updating the database and mapping from input format to intermediate processing formats.

In one example, the process manager dynamically creates an instance of the particular country action handler based on the country of the eDocument. The country action handler class then delegates the call to the Generic Action handler. Generic action handler then calls corresponding methods based on the action to be performed. Sample actions handled by these classes include: Create eDocument; Submit eDocument; Get Status of an eDocument; and Cancel eDocument.

Figure 14:
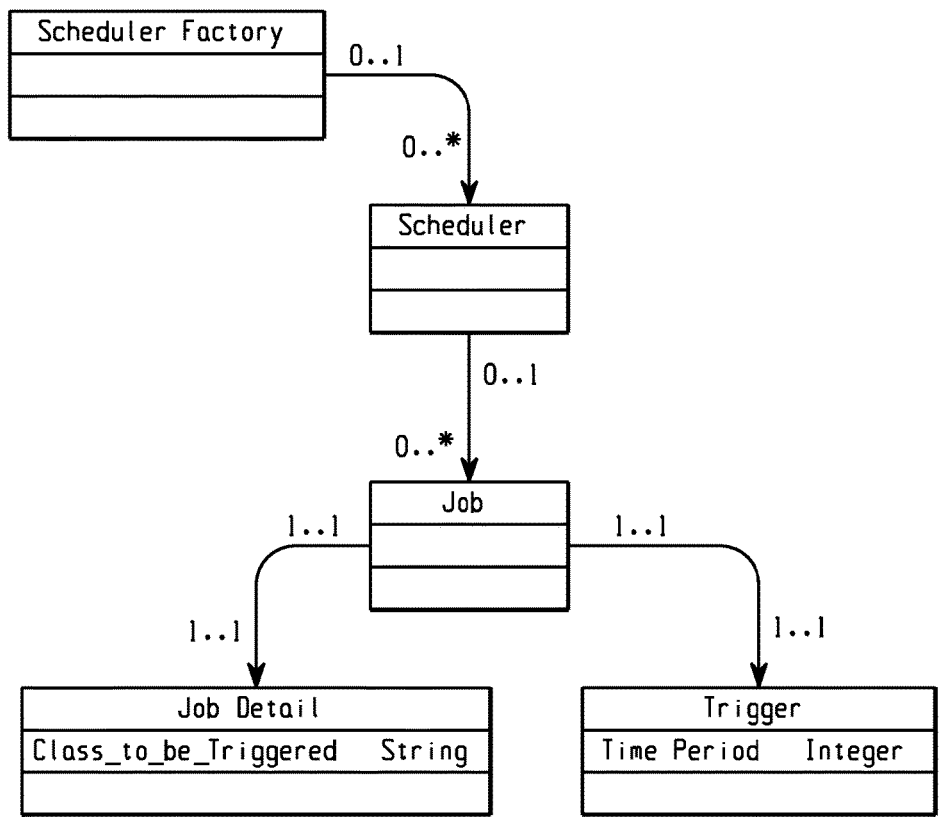
FIG. 14 is a diagram depicting an example process flow for a scheduler.

FIG. 14 is a diagram depicting an example process flow for a scheduler. A scheduler can automate actions to be taken on eDocuments which do not necessarily require user input. Actions can generally be triggered from the eDocument Monitor UI or by a source system by calling one of the web service methods. To enable triggering of an action automatically, a scheduler is configured to pick up specific eDocuments from the database and pass them to the eDocument Manager at specified time intervals. Example actions of a scheduler include: pick eDocuments that have not reached the final state and pass them to eDocument Manager at defined time intervals; provide control at the level of a customer, country, process to start, stop, pause jobs; provide control to trigger different jobs at different time intervals; and provide logs of the background processing for an administrator-level user.

Figure 15:
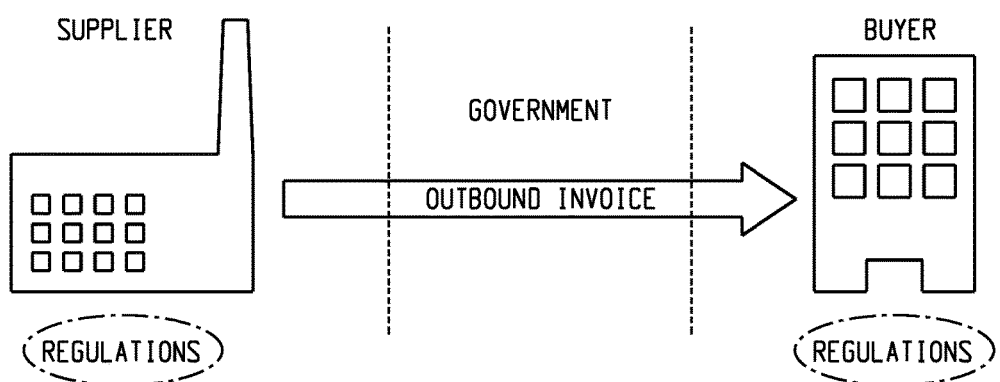
FIG. 15 is a diagram depicting an example use case for certain systems and methods for transmitting documents via a computer network as described herein.

FIG. 15 is a diagram depicting an example use case for certain systems and methods for transmitting documents via a computer network as described herein. In the example of FIG. 15, a buyer agrees to purchase units from a supplier. Based on that agreement, the supplier sends the buyer an invoice. But, that invoice must be processed through a government intermediate entity (e.g., to ensure proper handling of tax issues). Thus, the electronic invoice is transmitted to the government entity before being transmitted to the buyer. For suppliers operating in multiple jurisdictions, adhering to the formatting and data transmission protocols of government entities in different jurisdictions can be cumbersome. Thus, certain systems and methods described herein can receive outbound invoices in a generic (e.g., XML) format, detect which government entity must receive that outbound invoice, and format the outbound invoice according to that government entity's requirements before transmitting the formatted invoice.

Figure 16:
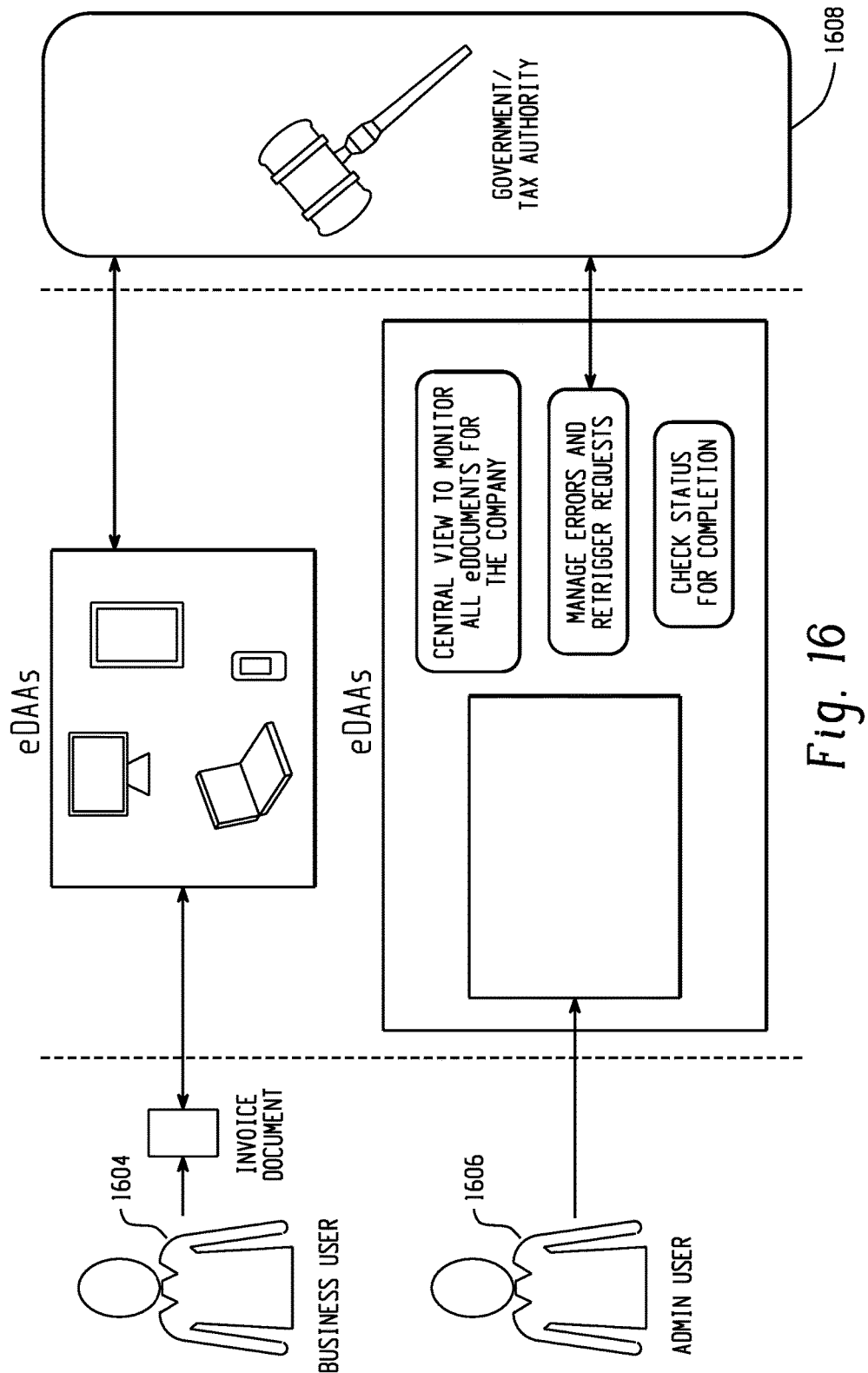
FIG. 16 is a diagram depicting an example network data flow for an intermediate destination manager.

FIG. 16 is a diagram depicting an example network data flow for an intermediate destination manager. The intermediate destination manager interacts with both business users 1604 and administrator users 1606. A business user makes a sale of a good or service and submits interaction data associated with that invoice to the intermediate destination manager. The intermediate destination manager is configured to identify an intermediate destination 1608 for the interaction data, to determine protocols and format requirements for that intermediate destination, and to format that interaction data for transmission to the identified intermediate destination 1608. An administrator user 1606 may be provided the same interfaces as the business user 1604 plus additional graphical user interfaces. For example, administrator users 1606 may be provided with a central view to manage all eDocuments for an organization, user interfaces for managing errors and manually retriggering requests, and status reports.

Figure 17A:
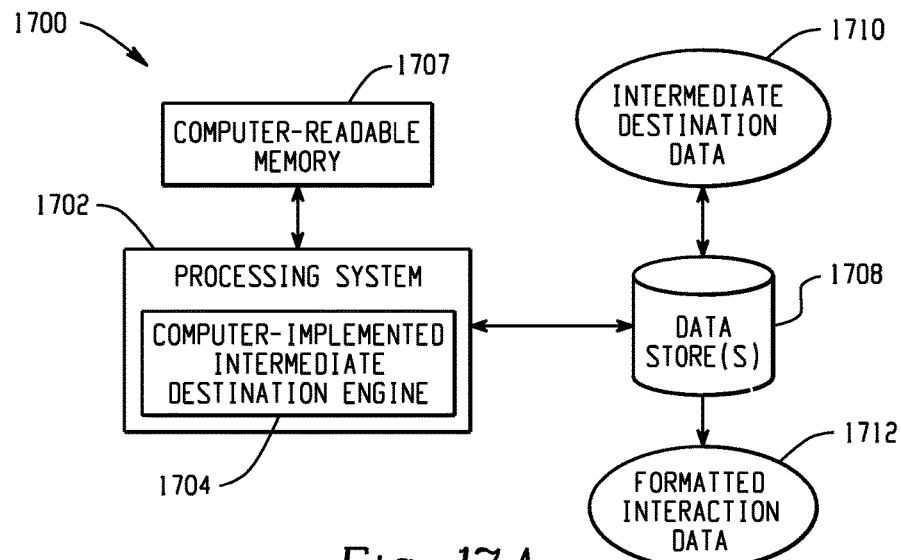
FIGS. 17A, 17B, and 17C depict example systems for implementing the approaches described herein for implementing a computer-implemented intermediate destination engine.
Figure 17B:
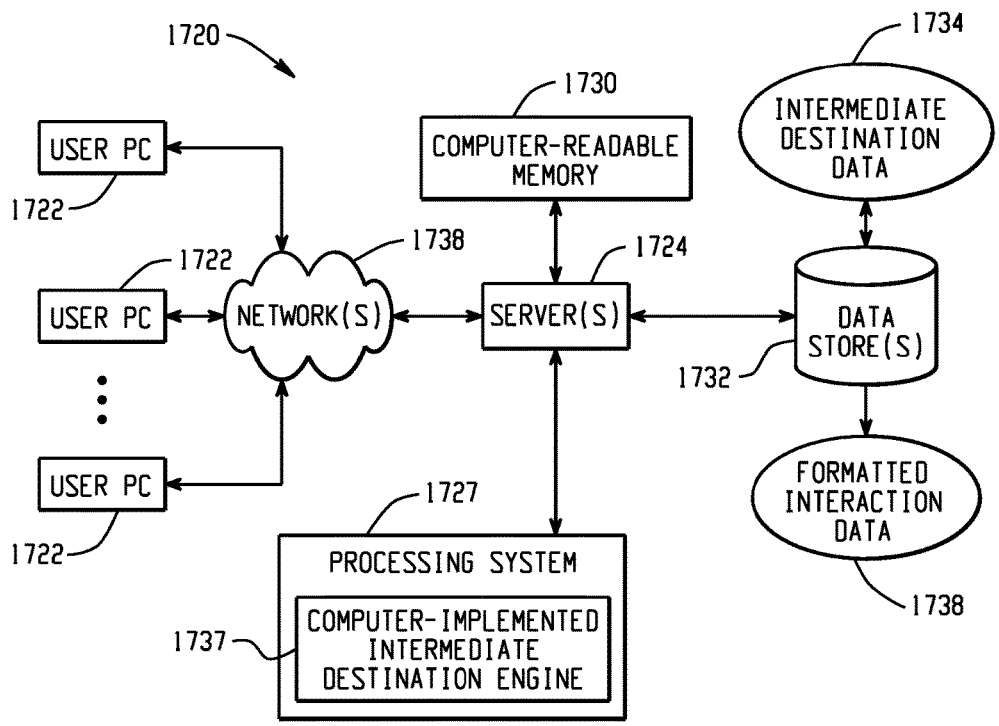
Figure 17C:
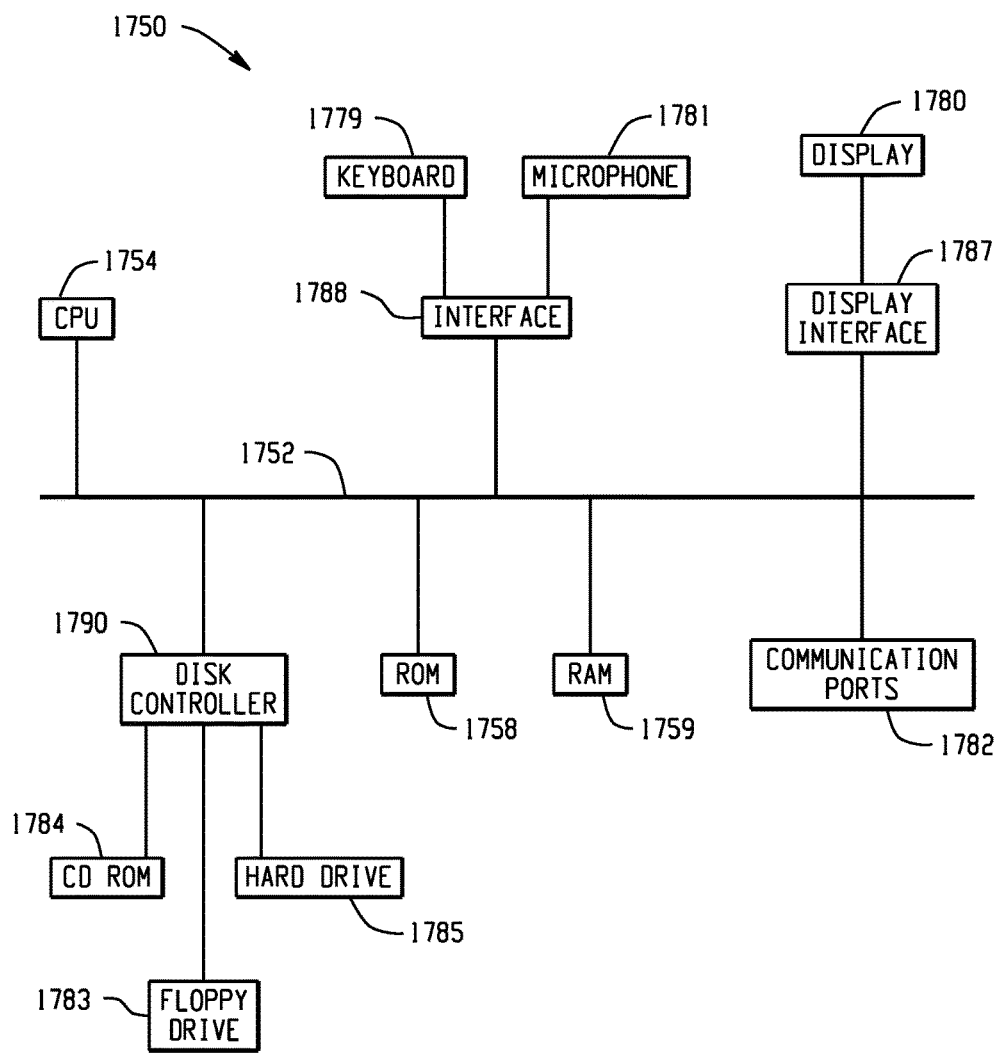

FIGS. 17A, 17B, and 17C depict example systems for implementing the approaches described herein for implementing a computer-implemented intermediate destination engine. For example, FIG. 17A depicts an exemplary system 1700 that includes a standalone computer architecture where a processing system 1702 (e.g., one or more computer processors located in a given computer or in multiple computers that may be separate and distinct from one another) includes a computer-implemented intermediate destination engine 1704 being executed on the processing system 1702. The processing system 1702 has access to a computer-readable memory 1707 in addition to one or more data stores 1708. The one or more data stores 1708 may include intermediate destination data 1710 as well as formatted interaction data 1712. The processing system 1702 may be a distributed parallel computing environment, which may be used to handle very large-scale data sets.

FIG. 17B depicts a system 1720 that includes a client-server architecture. One or more user PCs 1722 access one or more servers 1724 running a computer-implemented intermediate destination engine 1737 on a processing system 1727 via one or more networks 1728. The one or more servers 1724 may access a computer-readable memory 1730 as well as one or more data stores 1732. The one or more data stores 1732 may include intermediate destination data 1734 as well as formatted interaction data 1738.

FIG. 17C shows a block diagram of exemplary hardware for a standalone computer architecture 1750, such as the architecture depicted in FIG. 17A that may be used to include and/or implement the program instructions of system embodiments of the present disclosure. A bus 1752 may serve as the information highway interconnecting the other illustrated components of the hardware. A processing system 1754 labeled CPU (central processing unit) (e.g., one or more computer processors at a given computer or at multiple computers), may perform calculations and logic operations required to execute a program. A non-transitory processor-readable storage medium, such as read only memory (ROM) 1758 and random access memory (RAM) 1759, may be in communication with the processing system 1754 and may include one or more programming instructions for performing the method of implementing a computer-implemented intermediate destination engine. Optionally, program instructions may be stored on a non-transitory computer-readable storage medium such as a magnetic disk, optical disk, recordable memory device, flash memory, or other physical storage medium.

In FIGS. 17A, 17B, and 17C, computer readable memories 1708, 1730, 1758, 1759 or data stores 1708, 1732, 1783, 1784, 1788 may include one or more data structures for storing and associating various data used in the example systems for implementing a computer-implemented intermediate destination engine. For example, a data structure stored in any of the aforementioned locations may be used to store data from XML files, initial parameters, and/or data for other variables described herein. A disk controller 1790 interfaces one or more optional disk drives to the system bus 1752. These disk drives may be external or internal floppy disk drives such as 1783, external or internal CD-ROM, CD-R, CD-RW or DVD drives such as 1784, or external or internal hard drives 1785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1790, the ROM 1758 and/or the RAM 1759. The processor 1754 may access one or more components as required.

A display interface 1787 may permit information from the bus 1752 to be displayed on a display 1780 in audio, graphic, or alphanumeric format. Communication with external devices may optionally occur using various communication ports 1782.

In addition to these computer-type components, the hardware may also include data input devices, such as a keyboard 1779, or other input device 1781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware (e.g., ASICs, FPGAs) configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A processor-implemented system for transmitting documents via a computer network, comprising:
    at least one processor; and
    a non-transitory computer readable media having computer executable instructions stored therein, which when executed by the at least one processor, causes the system to perform operations comprising:
    receiving, via a network interface, interaction data from a first entity, the interaction data based on an interaction between the first entity and a second entity, wherein communicating from the first entity to the second entity requires transmitting the interaction data to a particular intermediate destination according to a predetermined data format;
    determining the particular intermediate destination for the interaction data by querying a database to:
        identify the particular intermediate destination associated with the second entity; and
        identify data submission process steps for the particular intermediate destination, the data submission process steps include the predetermined data format and a particular protocol; and
    generating intermediate interaction data from the interaction data according to the predetermined data format; and
    transmitting the intermediate interaction data to the particular intermediate destination according to the particular protocol,
    wherein the interaction data is further transmitted from the intermediate destination to the second entity, further wherein the database stores a plurality of destination records for a plurality of destinations reachable over a network and when the respective intermediate destination or the respective data submission process for any of the plurality of destinations changes, a respective database record in the database is updated to reflect the change.

2. The system of claim 1, wherein the intermediate destination is a legacy system.

3. The system of claim 1, wherein the computer executable instructions further configure the system to run in a batch mode, where, during a time of low activity in the system, a plurality of sets of interaction data are consecutively processed by the system and transmitted to a plurality of intermediate destinations.

4. The system of claim 1, wherein the computer executable instructions further configure the system to operate in a command mode, where one or more sets of interaction data are processed based on receipt of a user command.

5. The system of claim 1, wherein the computer executable instructions further configure the system to process one or more sets of interaction data based on a current time.

6. The system of claim 1, wherein the database destination records include more than one intermediate destination for the second entity, and each of the more than one intermediate destinations for the second entity is associated with different data submission process steps, and wherein transmitting the intermediate interaction data includes transmitting to each of the more than one intermediate destinations more than one protocol, and further wherein the database stores at least one destination record associated with a respective one of the plurality of destinations and identifies a respective intermediate destination and a respective data submission process.

7. The system of claim 1, wherein all entities submitting interaction data to the system submit interaction data in a same predetermined format.

8. The system of claim 7, wherein the predetermined data format is an XML based format generated by a processing system local to the first entity.

9. The system of claim 1, wherein the computer executable instructions further configure the system to provide data associated with a current status of each set of interaction data.

10. The system of claim 9, wherein the current status is one of: interaction data received, interaction data processed, interaction data transmitted to intermediate destination, interaction data accepted by intermediate destination, intermediate data received at section entity, or an error condition is associated with the interaction data.

11. The system of claim 1, wherein the interaction data expressly identifies the intermediate destination.

12. The system of claim 1, wherein the interaction data does not identify the intermediate destination, wherein the computer executable instructions further configure the system to identify the intermediate destination based on a type of interaction detected between the first entity and the second entity.

13. The system of claim 12, wherein the system receives interaction data from different locations associated with the first entity, wherein the computer executable instructions further configure the system to identify the intermediate destination based on from which of the different locations of the first entity the interaction data is received.

14. The system of claim 1, wherein the system for transmitting documents via a computer network is provided as a cloud service via a networked server.

15. A processor-implemented method for transmitting documents via a computer network, comprising:
  receiving interaction data based on an interaction between a first entity and a second entity from the first entity via a network, wherein communicating from the first entity to the second entity requires transmitting the interaction data to a particular intermediate destination according to a predetermined data format;
  identifying a particular intermediate destination for the interaction data using the database, by:
    identifying the particular intermediate destination associated with the second entity; and
    identifying data submission process steps for the particular intermediate destination, the data submission process steps include the predetermined data format and a particular protocol;
  generating intermediate interaction data from the interaction data according to the predetermined data format and
  transmitting the intermediate interaction data to the particular intermediate destination according to the particular protocol, wherein the interaction data is further transmitted from the intermediate destination to the second entity, further wherein the database stores a plurality of destination records for a plurality of destinations reachable over a network and when the respective intermediate destination or the respective data submission process for any of the plurality of destinations changes, a respective database record is updated to reflect the change.

16. The method of claim 15, the database destination records include more than one intermediate destination for the second entity, and each of the more than one intermediate destinations for the second entity is associated with different data submission process steps, and wherein transmitting the intermediate interaction data includes transmitting to each of the more than one intermediate destinations more than one protocol.

17. The method of claim 15, wherein all entities submitting interaction data to the system submit interaction data in a same predetermined format.

18. The method of claim 17, wherein the predetermined data format is an XML based format generated by a processing system local to the first entity.

19. The method of claim 1, further comprising providing data associated with a current status of each set of interaction data in a report.

20. A non-transitory computer-readable medium encoded with instructions for commanding one or more data processors to execute steps of a method for transmitting documents via a computer network, the steps comprising:
  receiving interaction data based on an interaction between a first entity and a second entity from the first entity according to a predetermined data format via a network;
  receiving interaction data based on an interaction between a first entity and a second entity from the first entity via a network, wherein communicating from the first entity to the second entity requires transmitting the interaction data to a particular intermediate destination according to a predetermined data format;
  identifying a particular intermediate destination for the interaction data using the database, by:
    identifying the particular intermediate destination associated with the second entity; and
    identifying data submission process steps for the particular intermediate destination, the data submission process steps include the predetermined data format and a particular protocol;
  generating intermediate interaction data from the interaction data according to the predetermined data format and
  transmitting the intermediate interaction data to the particular intermediate destination according to the particular protocol, wherein the interaction data is further transmitted from the intermediate destination to the second entity, further wherein the database stores a plurality of destination records for a plurality of destinations reachable over a network and when the respective intermediate destination or the respective data submission process for any of the plurality of destinations changes, a respective database record is updated to reflect the change.

* * * * *